Jan. 12, 1971   D. L. HINGS   3,555,380

LINEAR ROLLING MOTOR

Filed Dec. 31, 1968   2 Sheets-Sheet 1

INVENTOR.
DONALD L. HINGS
BY Woodling, Krost,
Granger and Rust
ATTORNEYS.

Jan. 12, 1971 D. L. HINGS 3,555,380
LINEAR ROLLING MOTOR
Filed Dec. 31, 1968 2 Sheets-Sheet 2

INVENTOR.
DONALD L. HINGS
BY Woodling, Krost,
Granger and Rust
ATTORNEYS.

United States Patent Office 3,555,380
Patented Jan. 12, 1971

3,555,380
LINEAR ROLLING MOTOR
Donald Lewes Hings, 250 N. Grosvenor,
Burnaby, British Columbia, Canada
Filed Dec. 31, 1968, Ser. No. 788,190
Int. Cl. H02k 41/06
U.S. Cl. 318—135
21 Claims

ABSTRACT OF THE DISCLOSURE

A linear motor is disclosed using stator electromagnets spaced along a linear guideway, for example, to guide a vehicle for rapid transit guidance and propulsion. The vehicle carries an armature reacting with the stator electromagnets for the propulsion of the vehicle. The armature is magnetically polarized as by a permanent magnet to eliminate any need for electrical power or control connections to the vehicle, for example, by the usual third rail or overhead catenary. The armature is preferably a rotatable wheel running on the guideway and the stator electromagnets are energized in travelling sequence to react with the armature to propel the vehicle independent of any torque on the wheel.

BACKGROUND OF THE INVENTION

Linear motors have been proposed to propel a movable object along a generally linear path as opposed to a rotary path as in the typical rotary motor. Such linear motors in many cases have utilized the induction motor principle with the stator coils and magnetically permeable laminations laid along a linear path and continuously energized by alternating current. The vehicle carries an armature for cooperating with this linear stator and this armature is similar to the rotary induction motor armature in that it has laminations and a short-circuited secondary winding. By the induction principle the changing stator field induces large circulating currents in the short-circuited armature winding which reacts to give a force moving the armature and hence the vehicle linearly along the guideway.

Where such linear induction motors have been used on baggage handling equipment, for example, the system showed a lack of precise control of the baggage handling vehicle because the vehicles bumped into each other due to the inprecise nature of coupling between the armature and stator. The typical induction motor slip varies with load on the vehicle and hence vehicle speeds were inprecisely controlled. Additionally the alternating current power to the stator winding increased appreciably when the armature was not immediately adjacent that particular stator section and this results in poor economics for such system. Further the air gap spacing between the armature and stator on such linear induction motors is incapable of precise spacing. When a vehicle is guided on rails, for example, the track bed cannot be made sufficiently precise to maintain uniform air gap spacing and this has a bad effect on the coupling and hence the force generated in the vehicle armature. This further aggravates the inprecise nature of the control of the vehicle and control of spacing between adjacent vehicles.

A still further disadvantage is the essentially constant speed characteristics of an induction motor dependent upon the frequency of the alternating voltage source applied to the stator windings and this means that the baggage handling vehicles, for example, tend to run at only a single speed, except for slip, and thus the acceleration and starting characteristics of the vehicle are quite poor. Just as in the typical induction rotary motor, auxiliary start-up equipment must be furnished at predetermined locations along the track. Thus if a vehicle should accidently stall at locations on the track other than where start-up equipment is located, such vehicle cannot be started.

Accordingly, an object of the present invention is to obviate the above-mentioned disadvantages.

Another object of the invention is to provide a linear propulsion system wherein no electrical power or control is needed in the vehicle being moved linearly.

Another object of the invention is to provide a linear motor which may be precisely controlled as to speed and position.

Another object of the invention is to provide a linear motor which is insensitive to transverse or vertical variations between the vehicle frame and the track or track bed.

Another object of the invention is to provide a linear motor wherein the stator disposed linearly along the guideway need not be continuously energized.

Another object of the invention is to provide a linear motor with self-starting and self-braking characteristics independent of torque and independent of adverse track surface conditions.

Another object of the invention is to provide a linear motor which has self-starting and self-stopping charactertistics without auxiliary equipment on the vehicle or along the linearly disposed stator.

SUMMARY OF THE INVENTION

The invention may be incorporated in a linear motor comprising, in combination, a linear stator guideway, a plurality of electromagnets with stator pole faces linearly spaced along said guideway, a movable member guided for linear movement along said guideway, a magnet having an armature pole face with a determinable magnetic polarity, means mounting said magnet on said movable member for cooperation of said armature pole face with said stator pole faces, and means to sequentially energize said electromagnets to have said stator pole faces sequentially react with said armature pole face to move said movable member linearly along said guideway.

Other objects and a fuller understanding of the invention may be had by referring to the following description and claims, taken in conjunction with the accompanying drawings.

DESCRIPTION OF THE INVENTION

Figure 1:
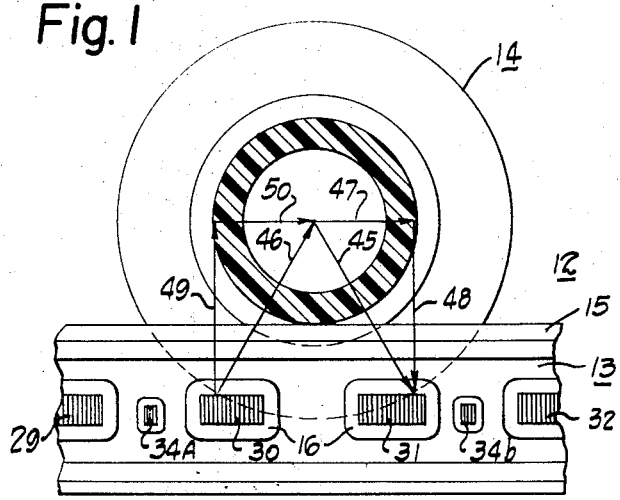
FIG. 1 is a side elevational view of a linear motor made in accordance with the invention.
Figure 2:
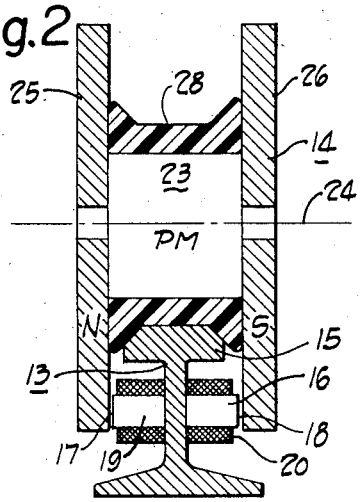
FIG. 2 is the front view of the motor of FIG. 1.

FIGS. 1 and 2 show side and front views of a linear motor 12 made in accordance with the invention. This motor 12 includes generally a linear stator 13 and a movable armature 14. The linear stator 13 includes some form of a linear guideway shown as a metal track 15. A plurality of stator electromagnets 16 are linearly spaced along the track or guideway 15. These stator electromagnets have stator pole faces 17 and 18 at opposite ends of the core 19 thereof with these pole faces 17 and 18 being of opposite polarity as determined by the polarity of the energization on a coil 20 surrounding the core 19. These pole faces 17 and 18 are linearly spaced along the guideway 15 and preferably are equidistantly spaced along a line parallel to the track 15.

The movable armature 14 is shown in the form of a wheel and specifically a rotatable magnetically polarized wheel. In this embodiment of FIGS. 1 and 2 the wheel or armature 14 is magnetically polarized by having a permanent magnet 23 disposed coaxially with the wheel 14 along the axis 24. Discs 25 and 26 are provided on opposite ends of the permanent magnet 23 to be established of opposite polarity in accordance with the axial polarization of the permanent magnet 23. These discs 25 and 26 become armature pole faces, especially the inner face of each, and the discs 25 and 26 establish the armature pole faces as being substantially circular and of homogeneous character. An alternative is to have the discs 25 and 26 themselves be permanent magnets axially polarized and the permanent magnet 23 would then become merely a magnetically permeable core to carry the flux between the two magnetic discs 25 and 26. In this embodiment FIG. 2 shows that the inner face of disc 25 is a north pole and the inner face of disc 26 is a south pole of this movable armature 14.

FIG. 1 shows a series of four of the stator electromagnets 29, 30, 31 and 32 linearly spaced along the track or guideway 15. The movable armature or wheel 14 may include a tire or collar 28 to ride on and be guided by the track 15 to maintain closely the tolerance or spacing between the pole faces 17 and 18 and the armature pole face discs 25 and 26. FIG. 1 also shows a sensing device 34 to sense position of the wheel or movable armature 14. This sensing device may be similar to the stator electromagnets in that it will have a magnetically permeable core and a coil of wire surrounding this coil to develop a pulse of voltage upon approach and again upon departure of the wheel 14.

Figure 3:
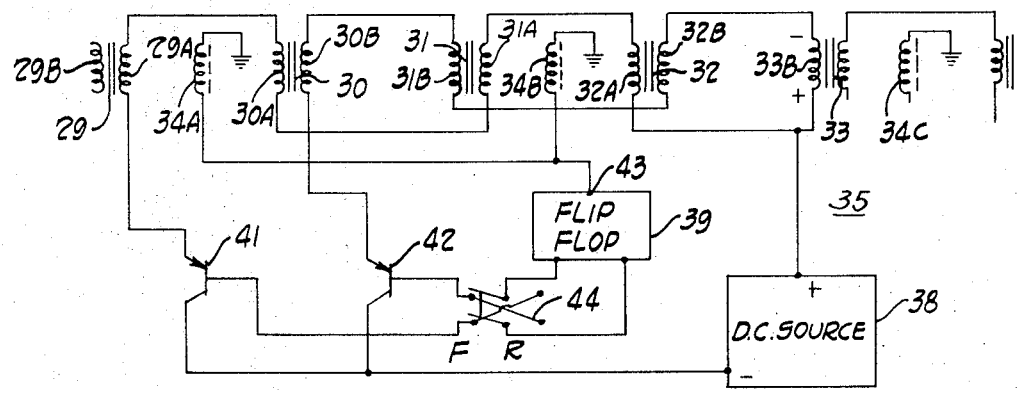
FIG. 3 is a schematic diagram of an electrical circuit to operate the motor of FIGS. 1 and 2.

FIG. 3 shows a schematic diagram of a control circuit 35 which may be used for the sequential energization of the stator electromagnets 16. This control circuit 35 shows five stator electromagnets 29–33. Each electromagnet has two windings denoted by the suffix A and B. A DC voltage source 38 is provided and a flip-flop circuit 39 is provided to control alternately two transistors 41 and 42. Sensing coils 34A and 34B are provided and connected together to an input terminal 43 of the flip-flop 39. In FIG. 1, let it be assumed that the movable armature 14 is moving from left to right as viewed in this figure. Also let it be assumed that the movable armature will move from left to right with respect to the stator electromagnets 29–33 in FIG. 3. The sensing device 34A will emit a pulse as the flange or disc 25 advances past and covers the pole face of that particular sensor. This would be at a position when the wheel was not yet advanced as far to the right as it is shown in this FIG. 1. This pulse of current in the sensing device 34A will trigger the flip-flop 39 so that transistor 41 is made conducting. This causes current flow from the positive terminal of the DC source 38 through the series connected coils 32A, 31A, 30A, and 29A, the transistor 41 and return to the negative terminal of the source 38 through a reversing switch 44. These four stator coils are wound alternately so that there is alternate attraction and repulsion of the next adjacent electromagnets with respect to the movable armature 14. For example, if in FIG. 2 the left side of the electromagnet were made a south pole and the right side made a north pole, then this would be an attraction relative to the permanent magnet 23. This would be the condition for electromagnet 30. Conversely, if the left end pole face 17 is made a north pole, and the right pole face 18 is made a south pole, then this is a repelling or repulsion relative to the field of the permanent magnet 23. This would be the condition for electromagnet 29. This moves the wheel to the right as will be explained below. Next as the wheel rim departs from the pole face of the sensing device 34A another voltage pulse is produced which again causes flip-flop 39 to flip to the opposite state. This causes transistor 41 to stop conducting and causes transistor 42 to commence conduction. Accordingly the circuit is made from the positive terminal of source 38 through the coils with a B suffix namely coil 33B, coil 32B, coil 31B, and coil 30B to return through the transistor 42 and reversing switch 44 to the negative terminal of source 38. At this time the wheel or movable armature 14 will be at first be about at electromagnet 30 and later will be about midway between the two electromagnets 30 and 31, and thus be about in the position shown in FIG. 1. In this energization condition the electromagnets 30 and 32 are in the repulsion condition and electromagnets 31 and 33 are in the attraction position. Viewing FIG. 1 it will be noted that electromagnet 31, under the attraction condition attracts the movable armature or wheel 14 toward the center of the pole face of electromagnet 31. The direction of electromagnetic pull is from the center or axis 24 of the permanent magnet 23 toward the center of the pole face 31 and hence is downwardly and forwardly along a force vector 45. Conversely, the electromagnet 30 is in a repelling mode and hence the force of this magnetic repulsion is along the line between the center of the pole face of electromagnet 30 toward the axis 24 of permanent magnet 23 which will be along the force vector 46 which is upwardly and forwardly.

The force vector 45 may be broken into components 47 and 48 which are horizontally forward and vertically downward, respectively. Similarly, the force vector 46 may be broken into a vertical force component 49 and a horizontal forward force component 50. It will be noted that the vertical force vectors 48 and 49 are transverse to the guideway 15 and also that they are equal and opposite to thus cancel. It will also be noted that a point on the periphery of the armature pole faces 25 or 26 moves transversely to the guideway 15 in a cycloidal path generally as shown by the vectors 45 and 46. The force vectors 47 and 50 are horizontal or in this case are parallel to the guideway 15 and are both additive in a linear direction to impel the vehicle, which would be attached to the wheel 14, linearly along the track 15.

It was at first expected that these electromagnets such as electromagnets 30 and 31 established a torque on the wheel 14 to cause it to rotate. However this is found to be not the case because if the wheel 14 is lifted by the axle to provide a slight clearance between the tire 28 and the track 15, there is found to be no tendency for the wheel 14 to rotate but still there remains the tendency of forward linear thrust as caused by the force vectors 47 and 50. This shows that a forward or linear force is developed or a thrust is developed independent of any torque in the wheel and independent of any friction or traction conditions existing between the wheel and the track 15. Thus the track can be slippery or icy or greasy, still the same force is developed. When the wheel 14 is in contact with the track 15, it does rotate but this is felt to be primarily because of the friction existing between the wheel and the track and the wheel simply rolls along the track under the combined thrust developed by the two electromagnets 30 and 31.

To return to the circuit of FIG. 3, when the wheel approaches the sensing device 34B so that the disc 25 passes and covers the pole face thereof, a pulse is developed by this sensing device 34B to cause the flip-flop 39 to again cause conduction of the transistor 41 and to cease conduction of transistor 42. This reestablishes the conditions mentioned before wherein the coils with the suffix A are energized and establishes the repelling magnetic conditions in electromagnets 29 and 31 and the attraction magnetic reaction in the electromagnets 30 and 32. This will again pull the wheel forwardly as described above until the wheel disc 25 departs from in front of the pole face of the sensing device 34B. This creates a fourth pulse to convert the flip-flop 39 so that transistor 41 ceases conduction and transistor 42 again conducts. This establishes energization of the coils with a suffix B so that electromagnet 33 attracts and electromagnet 32 repels to again cause the wheel to move forwardly so that the wheel will next react with the third sensing device 34C. This will start another chain of events the same as those previously outlined to control the next group of four electromagnets. Thus, the stator electromagnets 16 are energized in a traveling sequency to impel the movable armature 14 linearly along the stator track 15.

Figure 4:
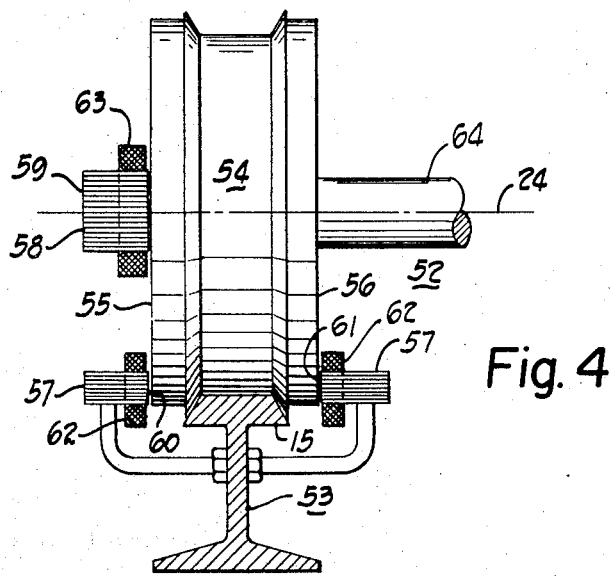
FIG. 4 is a front view of a preferred embodiment of linear motor.
Figure 5:
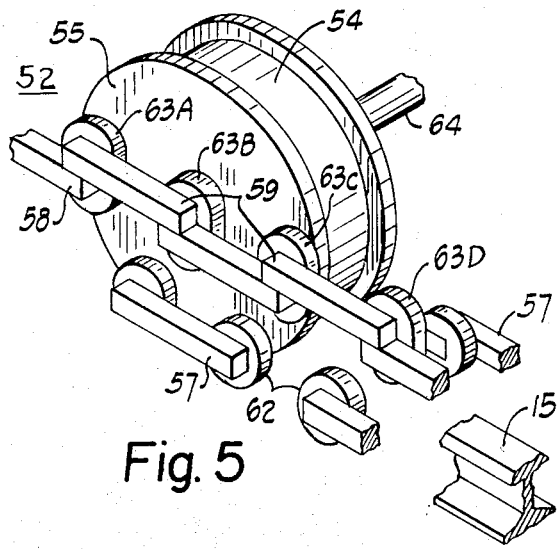
FIG. 5 is an isometric view of the motor of FIG. 4.

FIGS. 4 and 5 show a second modification of the invention showing a linear motor 52 with a linear stator 53 and reacting with a movable armature 54. Again this movable armature is shown as a wheel with circular homogeneous pole faces 55 and 56 fixed to and rotating with the wheel. Again these may be formed from a central core which is a permanent magnet and then magnetically permeable discs axially attached to this permanent magnet core. Alternatively they may be permanent magnet discs axially magnetized and fixed on opposite sides of a magnetically permeable core to carry the flux. In either case the pole faces 55 and 56 are fixed or determinable to be of opposite magnetic polarity. The linear stator 53 is held on and a part of the track or the guideway 15. The linear stator 53 includes a plurality of stator electromagnets 57, 58, and 59. FIG. 5 rather diagrammatically shows how these three sets of stator electromagnets are linearly disposed along relative to the track 15. The first series of stator electromagnets 57 are arranged in a linear series so that the pole faces thereof are equidistantly spaced linearly along the track 15 and cooperate with the lower arcuate portion of the armature pole faces 55 and 56. The stator electromagnets 58 are arranged together with stator electromagnets 59 in alternate layers and adjacent to each other to be disposed at a level about midway of the axis 24 of the wheel or movable armature 54. The wheel 54 may be journalled on an axle 64 for support of a vehicle. Stator coils 62 may surround each core of the stator electromagnets 57 or as shown may surround each pole tip for two coils for each core as shown in FIG. 5. Larger stator coils 63 surround both adjacent pole tips of the electromagnets 58 and 59 to energize these electromagnets. The series of electromagnets 57 are duplicated on both sides of the wheel 54 by energizing one or both of the coils 62 on a particular core of a stator electromagnet. This will make the two pole faces which sequentially cooperate with the moving wheel 54 of opposite polarity. Accordingly, one will be an attraction and one will be a repelling force similar to that established for the construction of FIGS. 1 and 2. Accordingly the circuit for sequential energization of these electromagnets may be the same as FIG. 3. The stator electromagnets 58 and 59 are provided to establish even more linear thrust on the wheel 54. As shown in FIG. 5 the coils 63 may be designated with the suffix A, B, C and D from left to right for the purpose of identifying the sequence for energization. At a first instant of time coil 63A would be energized to provide a repulsion magnetic force on the wheel and coil 63C would at the same time be energized to establish an attraction magnetic force on the wheel 54. The sensing devices 34 are not shown in FIG. 5 for clarity, but would be positioned similar to their positioning in FIG. 1 intermediate adjacent pairs of stator electromagnet pole faces. This could be between adjacent cores of these electromagnets or could be between the two poles on one particular core. In either event the position of the wheel is sensed at least periodically relative to the plurality of stator electromagnets. When the wheel has moved forwardly about one-half its diameter, then the sensing devices would change the sequence of energization so that coil 63B is energized to provide a repelling magnetic force and coil 63D is energized to provide an attraction magnetic force. This traveling sequence of stator electromagnet energization may be achieved by a circuit similar to that shown in FIG. 3. The stator electromagnets 57 on the rear side of the wheel as shown in FIGS. 4 and 5 may be energized in parallel with those shown on the front side of the wheel to increase the thrust developed on the wheel 54.

Figure 6:
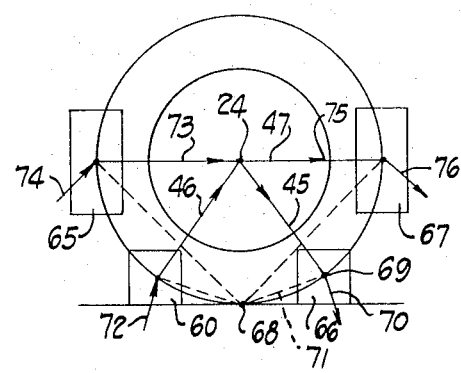
FIG. 6 is a schematic side view of the motor of FIGS. 4 and 5 illustrating the forces involved.

FIG. 6 is a diagrammatic illustration of the six pole faces which react with one side of the wheel at the armature pole face 55, for example. Pole face 60 is about at the seven o'clock position on FIG. 6 and is a pole face of one of the stator electromagnets 57. A double pole face 65 is at the nine o'clock position and in FIG. 5 is that pole face which is double pole face surrounded by the coil 63A. In FIG. 6 the pole face 66 is that at the five o'clock position and would be the pole face at the right end of the core of stator electromagnet 57 as shown in FIG. 5. In FIG. 6 on a double pole face 67 is shown at the three o'clock position and is that surrounded by coils 63C as shown in FIG. 5.

Pole face 66 is that which is energized for attraction when the wheel is in the relative position as shown in FIG. 6. The angle at which the magnetic attraction is applied is along the force vector 45 from the center or axis 24 of the wheel 54 to the center of the pole face 66. Because of this magnetic attraction the force vector 45 acts transversely toward the track 15 at a point 69 on the circular rim ahead of the axis 24 of the wheel to tend to force the wheel forwardly in accordance with the force vector 47. As it moves forwardly the wheel itself acts like a lever with a fulcrum at a point 68 which bears upon the rail or track 15. This magnetic attraction or pull is effective at the rim or a portion of the periphery of the wheel 54, effectively at a point 69. The angle of leverage is indicated by a force vector 70 which is perpendicular to a reference line 71 joining the fulcrum 68 with the point of force application 69. It will be noted that this force vector 70 of the angle of leverage is almost in line with the force vector 45 so that the two are almost directly additive. The reference line 71 represents the length of the lever arm through which the force vector 70 acts and accordingly the wheel rolls forwardly.

The pole face 60 acts in a repelling manner on the wheel 54 along the force vector 46 and similar to that for the pole face 66 there is a force vector 72 acting transversely away from the track 15 on a portion of the circular rim behind the axis of the wheel to aid the force vector 46 in moving the wheel forwardly down the track. With respect to the pole face 65, there is a force vector 73 of magnetic repulsion from the pole face 65 to the axis 24 of the wheel 54. Also there is a force vector 74 of the angle of leverage which again is perpendicular to a line from the point of application to the fulcrum 68. For the pole face 67 there is a force vector 75 caused by the magnetic attraction and there is also a force vector 76 of the angle of leverage which vector 76 is perpendicular to a line joining the point of force application with the fulcrum 68. It will be noted that the two force vectors 74 and 76 are at an angle of about 45 degrees relative to the associated magnetic repulsion and attraction force vectors 73 and 75, respectively. This lowers the effective addition of vectors 73 and 74 and the effective addition of the vectors 75 and 76; however these two sets of vectors are still additive to produce a total linear thrust on the wheel 54 to move it linearly along the track 15.

As stated above the wheel 54 may be lifted by its bearings so that it is free to rotate and so that there is a slight clearance between the wheel periphery and the track 15. Under such conditions, it has been found that the wheel does not exhibit any tendency to have any torque. This is, it does not tend to rotate, yet still there is a linear force vector developed to move the entire wheel linearly down the track 15. The fact that the wheel does not tend to rotate, and does not develop any torque when it is spaced from the track 15, shows that the movable armature 54 need not be constructed as a wheel and need not be constructed as a rotatable device. However, it has been found that the linear force or thrust developed on this movable armature 54 is enhanced by making the armature a wheel so that it does actually roll down the length of the track 15. The reason for this is believed to be because of the additional force developed by the force vectors 70, 72, 74 and 76 which are force vectors of the angle of leverage helping to lever the wheel linearly along the track 15. As an analogy this may be similar to the crowbar type instrument which is used to lever a heavily loaded freight car along a railroad track by jamming it under the rear of the wheel and slightly lifting in the small angle between the wheel and the track, and this is well-known to effectively move a heavy freight car.

As shown in FIG. 5 the series of stator electromagnets 58 and 59 effectively make one long continuous core and thus it will be appreciated that one long continuous core may be made all in line rather than staggered as shown in FIG. 5, with this long continuous core having pole tips and pole faces extending transversely therefrom toward the surface of the armature pole face 55.

Figure 7:
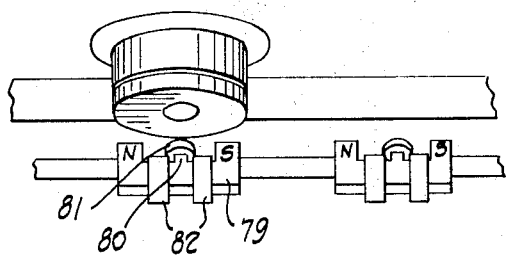
FIG. 7 is an isometric view of still another modification.

FIG. 7 shows another version of a stator electromagnet 79 which may be used in conjunction with a movable armature, for example in place of the linearly disposed stator electromagnet 57 of FIGS. 4 and 5. This stator electromagnet is E-shaped and the two pole tips of the E-shape are the pole tips bearing active pole faces of the stator electromagnet 79. The center pole tip 80 is surrounded by a coil 81 and constitutes the sensing device which may be used in place of the sensing device 34 of FIG. 1 and 2. In this case the sensing device 80, 81 utilizes the same core as the coils 82 of the stator electromagnet 79. So long as both coils 82 are energized to establish opposite poles on the pole faces of the electromagnet, the center pole 80 will be at a neutral magnetic position and will not receive any pickup from this magnetism established by coils 82 and hence the coil 81 may be used as a sensing device similar to sensing device 34.

Figure 8:
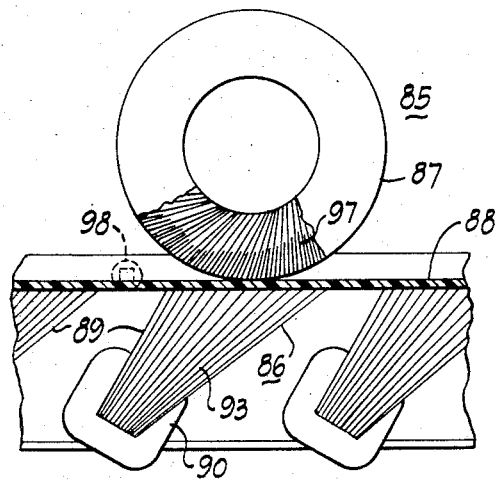
FIGS. 8 and 9 are side and front views of still another modification of the invention.
Figure 9:
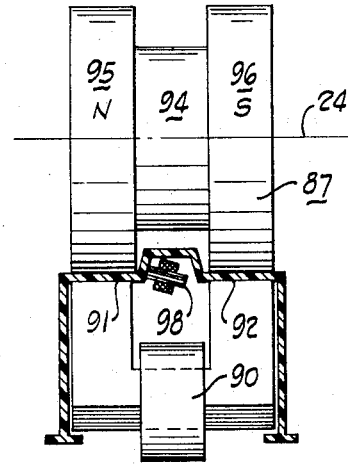

FIGS. 8 and 9 show another modification of the invention with a linear motor 85 comprising generally a linear stator 86 and a movable armature 87. The linear stator includes a track or guideway 88 along which a series of stator electromagnets 89 are provided. Only one of the stator electromagnets and a part of two others are shown in FIG. 8. A coil 90 surrounds each stator electromagnet 89 to establish opposite magnetic poles at pole faces 91 and 92. The laminations of the core 93 of the electromagnet 89 are non-linear, that is they gradually fan out as they approach the surface of the track 88 and the individual laminations are U-shaped to establish these two pole faces 91 and 92 at the underneath portion of the track 88, which track is preferably non-magnetic.

A movable armature 87 includes one or more permanent magnets 94 in the center thereof axially magnetized along the axis 24. Tire portions 95 and 96 are provided on the two axial ends of the permanent magnet 94 to act as armature poles faces. These tire portions are formed from laminations which are nonlinear and somewhat radially disposed although not directly along the radius because they are also disposed at an angle, for example, 30 degrees to the radius. Extra leaves 97 may be placed in the laminations to fill the space at the outer periphery of the tire portions 95 and 96. These tire portions ride on the track 88 and react with the pole faces 91 and 92.

In operation, the movable armature 87 tends to move to the left as viewed in FIG. 8 when the coil 90 is energized. This is because the laminations of both the stator electromagnet and the tire portions 95 and 96 are nonlinear and have a nonlinear gradient such that the magnetic intensity would be greatest at the left edge of the pole faces 91 and 92 as viewed in FIG. 8. As the wheel approaches this point of maximum magnetic intensity, the wheel tire portion 95 passes adjacent a sensing device 98 creating a pulse which is used in an electrical circuit similar to that in FIG. 3 to deenergize the stator electromagnet beneath the wheel and to energize the one which is leading with respect to the direction of motion of the wheel 87. Accordingly an attractive magnetic force is created on the wheel 87 to in turn create a linear force moving the movable armature 87 along the guideway or track 88. In this modification the coil 90 is energized with direct current so that pole face 91 is always of one polarity relative to pole face 92. In a modification, it is possible to make the member 94 a magnetically permeable member but not a permanent magnet. In such case the coil 90 may be energized with alternating current, for example, of a usual power frequency of 50 or 60 Hz. and the linear motor 85 will then develop a linear force to the left, as viewed in FIG. 8. It has been found, however, that direct current energization of the coils 90 is superior and develops a greater linear force. In alternating current operation, the pole faces 91 and 92 will alternate in polarity and will thus have a determinable polarity for only a period of time equal to the time of one-half cycle of the energizing frequency.

It will be noted in FIGS. 1 and 2 that the rim of the wheel which reacts with the stator electromagnets is larger in diameter than the tire portion of the wheel which rides on the guideway or track 15. However, in the design of FIGS. 4 and 5, and the design of FIGS. 8 and 9, these two diameters are approximately equal. Accordingly in the design of FIGS. 1 and 2 the stator electromagnets act on the movable armature at a greater lever arm than the radial distance of the wheel riding on the track; and hence, a greater leverage and a slower speed action is obtained. Conversely, the designs of FIGS. 4 and 5 and FIGS. 8 and 9 would not have as great leverage and would be more suitable for higher speed operation.

In the design of FIGS. 1 and 2 and the circuit of FIG. 3, it will be noted that a total of four coils are energized at one time by being connected in series. Thus it is possible for these four coils to react with a bogie axle assembly wherein two wheels closely follow each other and wherein the spacing of the wheels is suitable to have the two leading coils reacting with the lead wheel and have the two lagging coils reacting with the rear wheel of this bogie.

In the circuit of FIG. 3, it is noted that there are actually five different stator electromagnets which are in use for this series of four coils. When transistor 42 is conducting it could be wired to connect in series the coils 29B, 30B, 31B and 32B and to omit the coil 33B. Thus the same four cores would be affected as when the transistor 41 is conducting. In such case the first stator electromagnet 29 would be an attraction electromagnet as well as electromagnet 31 whereas electromagnets 30 and 32 would be repulsion electromagnets to provide necessary linear force on the movable armature 14. This would involve only a group of four electromagnets rather than five at any one section of the track. However, it is felt that the circuit as described in FIG. 3 is preferable because as the sensing device 34B emits a pulse as the wheel departs from adjacent its pole face, this establishes transistor 42 in a conducting condition and the coil 33B is energized so that this stator electromagnet 33 is in the attracting condition. This helps to provide a smooth flow of power to the movable armature 14 to linearly force this wheel along the track.

In one device made in accordance with the invention, it has been found that the performance efficiency was 22 percent for a single wheel and this might be raised considerably higher with a bogie wheel assembly. This efficiency is the actual transit efficiency and not the motor efficiency as in the case of an individual drive having a wheel which develops torque. In short the energy goes to moving the wheel linearly down the track and not in turning the wheel and therefore there is no traction problems for either fast stopping or starting.

In one device made in accordance with the invention, there were two wheels on an axle weighing approximately two pounds. This device was accelerated on a level track from a standing start using only a small amount of power on the stator electromagnets. The acceleration was found to be about four feet per second per second to reach a velocity of about three miles per hour at the end of only the first second. This would be with the reversing switch 44 in the forward position as shown in FIG. 3. Now with this reversing switch thrown to the reverse position this reverses the sense of the transistors 41 and 42 which are triggered into conduction upon passage of the wheel near the sensing devices 34. This may be used for a braking condition to brake the wheel when it is traveling in a forward direction because it makes those electromagnets which were formerly in an attraction mode now in a repulsion mode, and those in a repulsion mode are now in an attraction mode. On this one device built in accordance with the invention, it was found that the braking was even more effective than the acceleration and when moving at a velocity of three miles per hour the device was braked to a stop within 9/10 of a second and in less than half the distance that it took to accelerate to that velocity. This was with using the same energy to start the wheel as was used to stop the wheel. Again the braking is effected without any torque actually acting on the wheel and instead there is only a linear force developed on the wheel so that this braking is effected regardless of track conditions, for example, if the track might be slippery and thus have a low coefficient of friction, the braking is still effected in the same distance. Also this same device easily accelerated from a standing start up a 15 percent grade.

The fact that the armature pole face is in a vertical plane in the embodiments of FIGS. 1–7 and the fact that the armature pole face actually rides on the track 88 in the embodiment of FIGS. 8 and 9, means that the linear motor of the present invention is insensitive to transverse or vertical variations between the vehicle frame and the track bed on which track 15 is mounted. This is not true with the typical prior art linear motor acting on the induction principle and which was quite sensitive to such transverse air gap variations. Actually in all of the modifications, it will be seen that the stator electromagnets will be energized in a travelling sequence, for example, upon being triggered into conduction by the sensing device 34. This means they only are energized for a short time, merely long enough to react with the moving armature and hence do not need to be continuously energized throughout the length of the track as in some linear induction motors.

In all of the modifications, it will be noted that there is at least one armature pole face which combines with a plurality of stator electromagnet pole faces in providing the linear thrust or force on the armature. As explained above for the operation of FIGS. 1 and 2 and in connection with a circuit of FIG. 3, it will be noted that a stator electromagnet pole face acts on the periphery of the circular wheel armature through only a small arc of the periphery as the wheel travels along the track during a particular electromagnet energization and polarization. This may be referred to as a travelling sequence of energization of the electromagnets to give the linear force to the wheel armature.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A linear motor comprising, in combination, a linear stator guideway,
   a plurality of electromagnets with stator faces linearly spaced along said guideway,
   a movable member guided for linear movement along said guideway,
   a magnet having an armature rotatable pole face with a determinable magnetic polarity,
   means mounting said magnet on said movable member for cooperation of said armature pole face with said stator pole faces by a cycloidal movement of a point on said armature pole face relative to said stator pole faces,
   and means to sequentially energize said electromagnets to have said stator pole faces sequentially react with said armature pole face to move a point on said armature pole face transversely to said linear guideway to move said movable member linearly along said guideway.

2. A linear motor as set forth in claim 1, wherein said magnet includes a permanent magnet in a generally disc-shape with a substantially circular periphery.

3. A linear motor as set forth in claim 2, wherein said permanent magnet is axially magnetized to have said armature pole face on one circular pole face thereof.

4. A linear motor as set forth in claim 1, wherein said magnet is a rotatable permanent magnet having a rotatable armature pole face with a circular periphery to react sequentially with said stator pole faces.

5. A linear motor as set forth in claim 4, wherein said stator electromagnets include a first group acting along a line generally tangent to the circular periphery of said armature pole face,
   and a second group of stator electromagnets acting along a second line generally parallel to the first group.

6. A linear motor as set forth in claim 5, wherein said second group acts generally along a diametral line of said armature pole face.

7. A linear motor as set forth in claim 1, wherein said stator electromagnets have first and second stator pole faces,
   and means to mount said stator pole faces generally perpendicularly of said guideway.

8. A linear motor as set forth in claim 1, wherein said stator electromagnets have first and second stator pole faces disposed generally linearly along said guideway.

9. A linear motor as set forth in claim 8, wherein said magnet has said armature pole face as a circular pole face of homogeneous magnetically permeable material capable of reacting with both said stator pole faces simultaneously to variably couple therewith.

10. A linear motor as set forth in claim 1, wherein said energization means energizes said electromagnets to have said stator pole faces sequentially repel said armature pole face.

11. A linear motor as set forth in claim 1, wherein said plurality of stator electromagnets include lead and lag electromagnets relative to the direction of motion of said movable member,
   and said energization means sequentially energizing said electromagnets to have the closest adjacent lead stator pole face attract said armature pole face and to have the closest adjacent lag stator pole face repel said armature pole face.

12. A linear motor as set forth in claim 1, including means to energize said electromagnets with alternating current.

13. A linear motor as set forth in claim 1, including laminations on a portion of said armature movable member.

14. A linear motor as set forth in claim 1, wherein said armature pole face is rotatable and has a substantially circular periphery, and wherein a given stator pole face cooperates with said armature pole face through only a small arc of the armature pole face as said movable member moves linearly along said guideway.

15. A linear motor as set forth in claim 14, wherein said plurality of stator electromagnets includes lead and lag electromagnets relative to the direction of motion of said movable member, and said energization means sequentially energizing said electromagnets to have a lead stator pole face attract a portion of the armature pole face ahead of the axis of said rotatable pole face to pull same transversely toward said guideway and to have a lag stator pole face repel another portion of said armature pole face behind the axis of said rotatable pole face to combine to linearly force said movable member along said guideway.

16. A method of impelling a magnetically polarizable armature with a rotatable pole face along a linear stator guideway by use of stator electromagnets, comprising the steps of, positioning stator electromagnet pole faces linearly along said guideway, and sequentially energizing said stator electromagnets in traveling sequence to move a point on said armature rotatable pole face in a cycloidal path transversely relative to said linear guideway to force said armature linearly along said guideway.

17. The method as set forth in claim 16, including lead and lag pole faces of said stator electromagnets relative to the direction of motion of said armature, and controlling said stator electromagnets to cause a lead stator pole face to attract the armature and a lag stator pole to repel the armature to combine to force the armature linearly along the guideway.

18. The method as set forth in claim 16, wherein the armature includes a wheel with a generally circular periphery.

19. The method as set forth in claim 18, wherein said stator electromagnets include lead and lag pole faces relative to the direction of motion of said wheel.

and sequentially energizing said stator electromagnets so that a lead stator pole face attracts a portion of the wheel ahead of the axis thereof to pull it transversely toward the guideway to thereby cause the wheel to roll linearly forwardly along the guideway.

20. The method as set forth in claim 18, wherein said stator eletcromagnets include lead and lag pole faces relative to the direction of motion of said wheel, and including sequentially energizing said stator electromagnets so that a lag stator pole face repels a portion of the wheel behind the axis thereof transversely away from said guideway to thereby cause said wheel to roll linearly forwardly along the guideway.

21. The method as set forth in claim 18, including lead and lag pole faces of said stator electromagnets relative to the direction of motion of said wheel, and sensing the wheel position for sequentially controlling said stator electromagnets to cause a lead stator pole face to attract the wheel transversely toward the guideway and a lag stator pole face to repel the wheel transversely away from the guideway to combine to force the wheel linearly along the guideway.

References Cited

UNITED STATES PATENTS

| 731,125 | 6/1903 | Patterson | 310—12 |
| 2,486,273 | 10/1949 | Gibson | 104—148X |
| 2,794,929 | 6/1957 | Adamski | 310—12 |
| 3,390,290 | 6/1968 | Kaplan | 310—178X |
| 3,435,312 | 3/1969 | De Coster | 318—135X |

FOREIGN PATENTS

| 1,353,598 | 1/1964 | France | 46—24.350 |

D. F. DUGGAN, Primary Examiner

U.S. Cl. X.R.

104—148; 310—12